United States Patent
Harada et al.

(10) Patent No.: US 9,895,806 B2
(45) Date of Patent: Feb. 20, 2018

(54) CONTROL DEVICE FOR ROBOT THAT PERFORMS WORK BY PRESSING TOOL AGAINST WORKPIECE

(71) Applicant: FANUC Corporation, Yamanashi (JP)

(72) Inventors: Kunihiko Harada, Yamanashi (JP); Hiromitsu Takahashi, Yamanashi (JP); Soichi Arita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 261 days.

(21) Appl. No.: 14/817,247

(22) Filed: Aug. 4, 2015

(65) Prior Publication Data

US 2016/0039092 A1 Feb. 11, 2016

(30) Foreign Application Priority Data

Aug. 5, 2014 (JP) ................................. 2014-159519

(51) Int. Cl.
*B25J 9/16* (2006.01)
*G05B 19/404* (2006.01)

(52) U.S. Cl.
CPC ........... *B25J 9/1679* (2013.01); *B25J 9/1641* (2013.01); *G05B 19/404* (2013.01); *G05B 2219/41078* (2013.01); *G05B 2219/41085* (2013.01); *G05B 2219/45091* (2013.01); *G05B 2219/45146* (2013.01); *Y10S 901/02* (2013.01); *Y10S 901/28* (2013.01); *Y10S 901/41* (2013.01)

(58) Field of Classification Search
None
See application file for complete search history.

(56) References Cited

U.S. PATENT DOCUMENTS

| | | | | |
|---|---|---|---|---|
| 5,517,100 | A | * 5/1996 | Matsubara | ............. G05B 19/19 318/617 |
| 5,590,244 | A | * 12/1996 | Nakata | ................... B25J 9/1684 318/578 |
| 2007/0188123 | A1 | * 8/2007 | Iwashita | .............. G05B 19/404 318/625 |
| 2013/0149062 | A1 | * 6/2013 | Kimura | ................. B23Q 15/06 409/80 |

FOREIGN PATENT DOCUMENTS

| | | |
|---|---|---|
| JP | 63-251811 A | 10/1988 |
| JP | 10-154007 A | 6/1998 |
| JP | 11-221707 A | 8/1999 |
| JP | 2001-150150 A | 6/2001 |
| JP | 3654475 B2 | 6/2005 |
| JP | 2008-32591 A | 2/2008 |
| JP | 2013-123757 A | 6/2013 |
| JP | 2015-99524 A | 5/2015 |

* cited by examiner

*Primary Examiner* — Jason Lin
(74) *Attorney, Agent, or Firm* — Hauptman Ham, LLP

(57) ABSTRACT

A robot control device includes a correction amount calculation unit that calculates a correction amount for collecting a deviation of a tip position of a tool attached to a tip of a robot due to an external force applied to the tool and a correction profile generation unit that generates a correction profile indicating a relationship between the correction amount calculated by the correction amount calculation unit and time.

6 Claims, 4 Drawing Sheets

CONTROL DEVICE FOR ROBOT THAT PERFORMS WORK BY PRESSING TOOL AGAINST WORKPIECE

RELATED APPLICATIONS

The present application claims priority to Japanese Application Number 2014-159519, filed Aug. 5, 2014, the disclosure of which is hereby incorporated by reference herein in its entirety.

BACKGROUND OF THE INVENTION

1. Field of the Invention

The present invention relates to a robot control device for controlling a robot that performs work by pressing a tool against a workpiece.

2. Description of the Related Art

FDS (flow drilling screw) is known as a mechanical joining method for mechanically joining a plurality of different kinds of metal members. The joining method is a technique in which a screw rotating at high speed is drilled into the metal members laminated on each other to weld the metal members to each other. Such a mechanical joining method as FDS does not generate any compound layer between the metal members, and thus is advantageous in terms of joining a plurality of different kinds of metal members to each other.

In addition, it is sufficient for the mechanical joining method such as FDS to bring the screw close to the metal members laminated on each other in only one direction. Accordingly, the use of a robot allows the mechanical joining method to be easily automated. Such a mechanical joining method is thus used in automobile assembly processes and the like where multi-materialization is desired.

In an FDS process, the robot receives a counteractive force against a force applied when drilling a screw into the metal members laminated on each other. The counteractive force received by the robot twists a speed reducer of the robot and deforms an arm of the robot, as a result of which a position of a tool tip of the robot is deviated. The deviation of the position of the tool tip leads to deviation of a joining position of the metal members, and therefore joining quality may be lowered or joining work may fail.

In order to correct such a positional deviation of a tool tip, there are known methods for correcting twisting of a speed reducer of a robot. Japanese Patent No. 3654475 discloses a control technique for a motor provided with a speed reducer whose positioning can be highly accurately performed without being affected by a twist angle of the speed reducer. Specifically, a compensation value is calculated on the basis of a current value occurring due to twisting of the speed reducer to perform feedback control.

In addition, Japanese Laid-open Patent Publication No. H11-221707 discloses a technique for preventing deviation of a tip position of a tool by fastening the tool and a workpiece to each other.

The technique disclosed in Japanese Patent No. 3654475 presupposes that an arm of the robot is a rigid body and there is no friction at a tip of the tool. However, in fact, the arm is an elastic body and will be deformed by a counteraction from a workpiece. Furthermore, in fact, friction is generated in the tip position of the tool. Accordingly, in the technique of Japanese Patent No. 3654475, the deformation of the arm and a delay occurring due to the feedback control causes deviation of the tip position of the tool.

Once positional deviation of the tip of the tool occurs, it is necessary to apply a force larger than a maximum static friction force between a surface of a metal member and a surface of the tool contacted therewith in a direction opposite to a direction of the positional deviation. This makes the control of the robot extremely complicated.

In addition, the technique of Japanese Laid-open Patent Publication No. H11-221707 needs a component for fastening the tool and the workpiece to each other. This makes the structure complicated and can also increase cost.

The present invention has been accomplished in view of the circumstances. It is an object of the invention to provide a robot control device that allows positional deviation of a tip of a tool to be easily corrected without using a specific component.

SUMMARY OF THE INVENTION

In order to achieve the above-described object, according to a first aspect of the present invention, there is provided a robot control device for controlling a robot that performs work by pressing a tool attached to a tip of the robot against a workpiece, the robot control device including: a correction amount calculation unit that calculates a correction amount for correcting a deviation of a tip position of the tool due to an external force applied to the tool; and a correction profile generation unit that generates a correction profile indicating a relationship between the correction amount calculated by the correction amount calculation unit and time.

According to a second aspect of the present invention, in the first aspect, as the tool starts to be pressed against the workpiece and the external force applied to the tool increases, the correction profile generation unit generates the correction profile so as to increase the correction amount.

According to a third aspect of the present invention, in the first aspect, as the tool starts to be separated from the workpiece and the external force applied to the tool decreases, the correction profile generation unit generates the correction profile so as to decrease the correction amount.

According to a fourth aspect of the present invention, any of the first to the third aspects, the robot control device further includes an inversion determination unit that determines whether the motor has been inverted on the basis of a current value of a motor provided on the robot or the tool; and a backlash correction amount calculation unit that, when the inversion determination unit determines that the motor has been inverted, calculates a backlash correction amount for correcting a deviation of the tip position of the tool due to backlash to add to the correction amount calculated by the correction amount calculation unit.

According to a fifth aspect of the present invention, in any of the first to the fourth aspects, the robot control device further includes a storage unit that stores a relationship between the current value of the motor provided on the robot or the tool and the external force applied to the tool; and an external force calculation unit that calculates the external force on the basis of the relationship stored in the storage unit and the current value of the motor.

According to a sixth aspect of the present invention, in the fifth aspect, the robot control device further includes a time-series storage unit that stores the current value of the motor in time series from starting to press the tool against the workpiece to completely separate the tool from the workpiece, and in which the external force calculation unit calculates the external force on the basis of the relationship stored in the storage unit and the current value of the motor stored in the time-series storage unit.

The foregoing and other objects, features, and advantages of the present invention will become more apparent from the following detailed description of typical embodiments of the invention illustrated in the accompanying drawings.

DETAILED DESCRIPTION

Hereinafter, exemplary embodiments of the present invention will be described with reference to the accompanying drawings. In the following drawings, the same members will be denoted by the same reference signs. For easier understanding of the invention, the drawings are depicted in different scales as appropriate.

Figure 1:
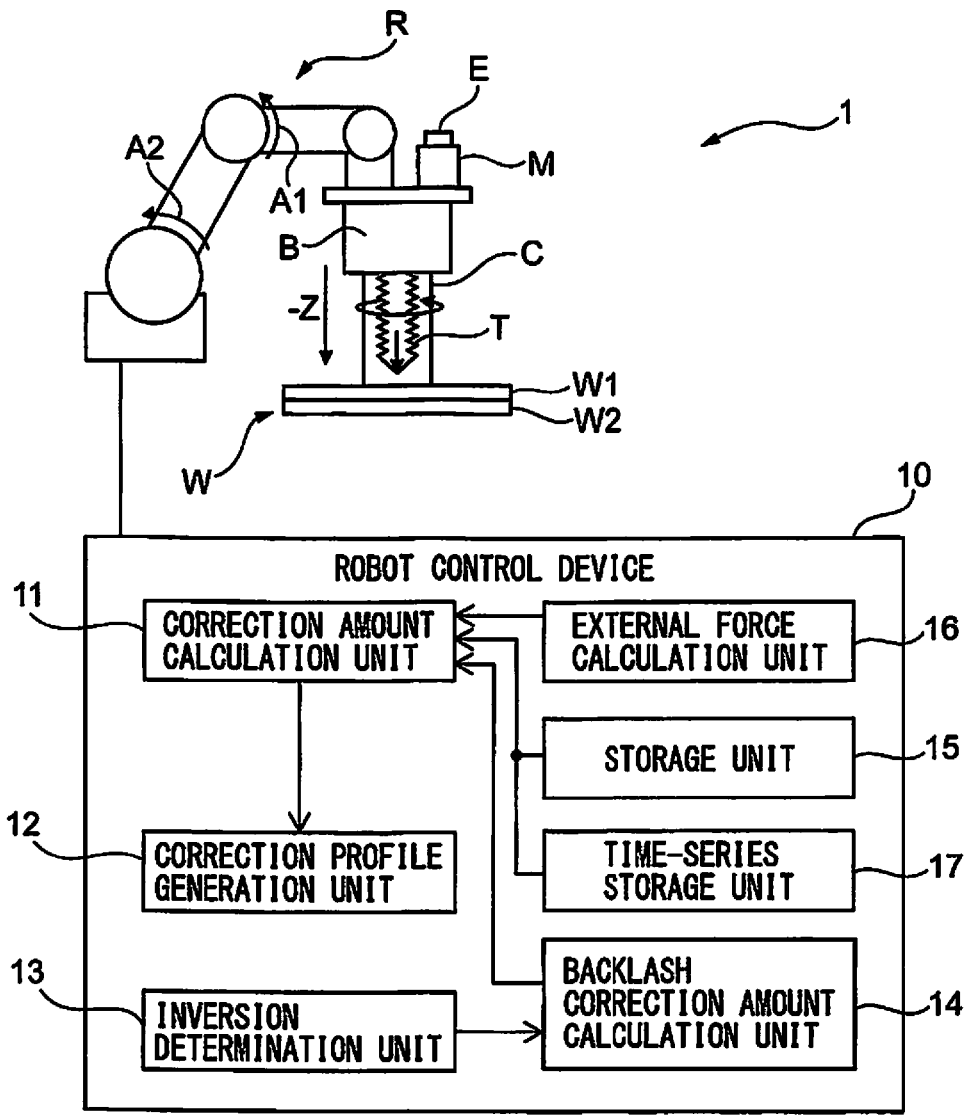
FIG. 1 is a functional block diagram of a control system including a robot control device according to an embodiment of the present invention.

FIG. 1 is a functional block diagram of a control system including a robot control device according to an embodiment of the present invention. A control system 1 depicted in FIG. 1 mainly includes a robot R and a robot control device 10 for controlling the robot R. The robot R is, for example, a six-shaft vertical multi-joint robot and has six shafts J1 to J6. In addition, the robot R includes a tool T, for example, a screw, attached to a tip thereof. The tool T is rotated by a motor M attached to a base B of the tool T. To the motor M is attached a position detector E, for example, an encoder, for detecting a position of the motor M.

A workpiece W depicted in FIG. 1 includes a first metal member W1 and a second metal member W2 that are of different kinds and laminated on each other. Typically, the first metal member W1 and the second metal member W2 are plate-like members having the same shape. However, the first and the second metal members W1 and W2 may be plate-like members whose outer shapes are different from each other. The control system 1 of the present embodiment is used for mechanically joining the first metal member W1 and the second metal member W2.

In addition, in FIG. 1, a press portion C is arranged around the tool T. A tip of the press portion C reaches the workpiece W before the tool T contacts with the workpiece W, thereby being able to prevent the tool T from being first pressed against the workpiece W. However, even when the control system 1 has a structure where the press portion C is excluded, it is also included in the scope of the present invention.

In the mechanical joining (FDS) of the first metal member W1 and the second metal member W2, a device (not depicted in the drawing) for bringing the tool T close to the workpiece W or separate the tool T therefrom or the robot R moves the tool T to the workpiece W while rotating the tool T by the motor M. When the tool T reaches the workpiece W, a counter-force from the workpiece W is applied to the tool T in a direction opposite to a moving direction of the tool T. In FIG. 1, as indicated by arrows A1 and A2, the counter-force twists a speed reducer (not depicted in the drawing) of the robot R and an arm thereof.

Figure 2:
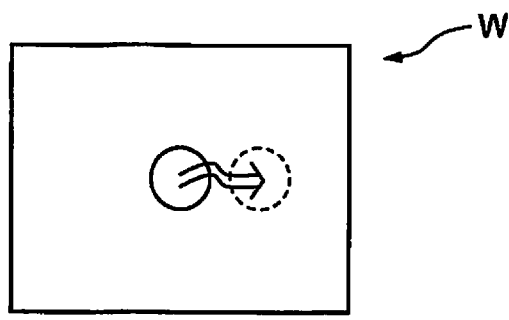
FIG. 2 is a plan view of a workpiece.

Due to this, a tip position of the tool T slides on the workpiece W and a processing position on the workpiece W can move to a position indicated by a broken line, as depicted in FIG. 2 as a plan view of the workpiece W. The present invention intends to solve this problem, as will be described later. Additionally, the present invention can be applied to correction of the tip position of the tool T in examples similar to FDS.

Referring back to FIG. 1, the robot control device 10 includes a correction amount calculation unit 11 that calculates a correction amount for correcting a deviation of the tip position of the tool T due to an external force applied to the tool T and a correction profile generation unit 12 that generates a correction profile indicating a relationship between the correction amount calculated by the correction amount calculation unit 11 and time.

Furthermore, the robot control device 10 includes an inversion determination unit 13 that determines whether the motor has been inverted on the basis of a current value of a motor of each shaft of the robot R and a backlash correction amount calculation unit 14 that, when the inversion determination unit 13 determines that the motor has been inverted, calculates a backlash correction amount for correcting a deviation of the tip position of the tool due to backlash of an inverted shaft to add to the above-mentioned correction amount. Instead of determining the inversion of the motor of each shaft of the robot R, the inversion determination unit 13 may determine inversion of the motor M provided on the tool T or a motor (not depicted in the drawing) for bringing the tool T close to the workpiece W and separate it therefrom.

Furthermore, the robot control device 10 includes a storage unit 15 that stores a relationship between the current value of the motor of each shaft of the robot R and the external force applied to the tool T in a form of a map or table and an external force calculation unit 16 that calculates an external force on the basis of the relationship stored in the storage unit 15 and the current value of the motor. The storage unit 15 may store a relationship between current value of the motor M provided on the tool T or the motor (not depicted in the drawing) for bringing the tool T close to the workpiece W and separate it therefrom and the external force.

Additionally, the robot control device 10 includes a time-series storage unit 17 that stores the current value of the motor M in time series from starting to press the tool T against the workpiece W to completely separate the tool from the workpiece. The time-series storage unit 17 may store the current value of the motor of each shaft of the robot R or the current value of the motor (not depicted in the drawing) for bringing the tool T close to the workpiece W and separate it therefrom, as described above.

Figure 3:
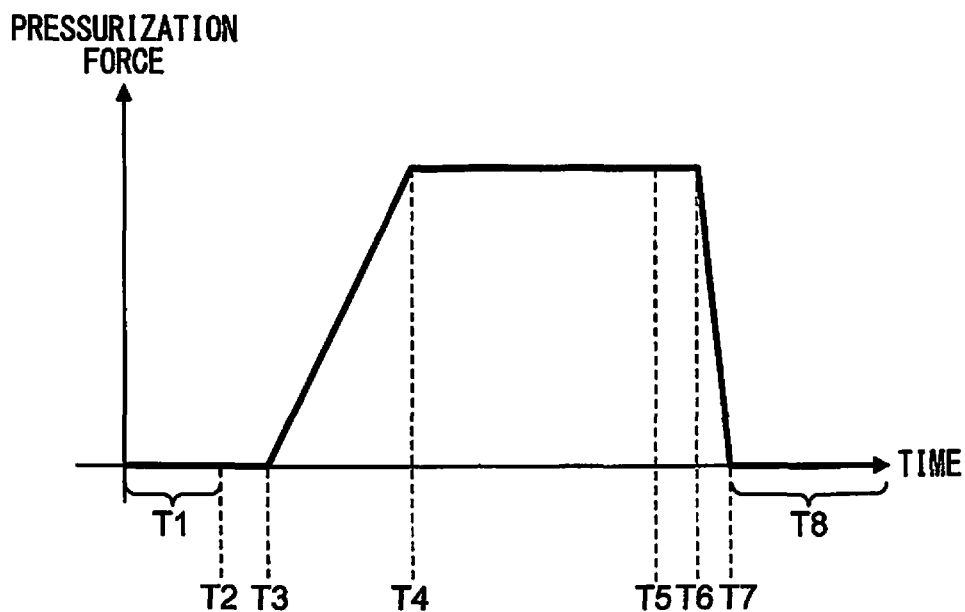
FIG. 3 is a diagram depicting a relationship between pressurization force and time.

FIG. 3 is a diagram depicting a relationship between pressurization force and time in the present embodiment. Hereinafter, a description will be given of a processing process for the control system 1 of the present embodiment with reference to FIG. 3. First, in a time range T1, the robot control device 10 drives the robot R to move the tool T to a desired processing position on the workpiece W. Then, at a time point T2, the robot control device 10 outputs a pressurization starting signal. Thereby, the motor M is driven to start to rotate the tool T, and then, the tool T is caused to descend to the workpiece W. In the time range T1 and at the time point T2, a pressurization force applied to the tool T is zero.

Then, at a time point T3, the tool T reaches the workpiece W and starts to be pressed against the workpiece W, whereby a mechanical joining process starts. Accordingly, as depicted in FIG. 3, the pressurization force starts to be generated from the time point T3. As can be seen in FIG. 3, the pressurization force linearly increases as time passes and then reaches a target pressurization force at a time point T4.

At a time point T5 at which a predetermined time has passed from the time point T4, the robot control device 10 outputs a pressure reduction starting signal. Thereby, at a time point T6, the tool T starts to be separated from the workpiece W, thus causing the pressurization force to decrease. As can be seen in FIG. 3, the pressurization force linearly decreases as time passes, and, at a time point T7, the pressurization force becomes zero, thereby completing the pressure reduction operation. This is a completion of the mechanical joining process in one processing position on the workpiece W. In a time range T8, the tool T is assumed to be moved to a next descending position on the workpiece W or the workpiece W is assumed to be replaced. In the conventional techniques, when the tip position of the tool T deviates in a range of from the time point T3 to the time point T4, it is necessary to apply a force larger than a maximum static friction force between a surface of the workpiece W and a surface of the tool T contacted therewith in a direction opposite to the direction of the positional deviation.

In order to cope with such a situation, in the present embodiment, the correction amount calculation unit 11 calculates a correction amount for correcting a deviation of the tip position of the tool due to an external force applied to the tool T. Then, the correction profile generation unit 12 generates a correction profile on the basis of a correction amount per predetermined control cycle.

Figure 4:
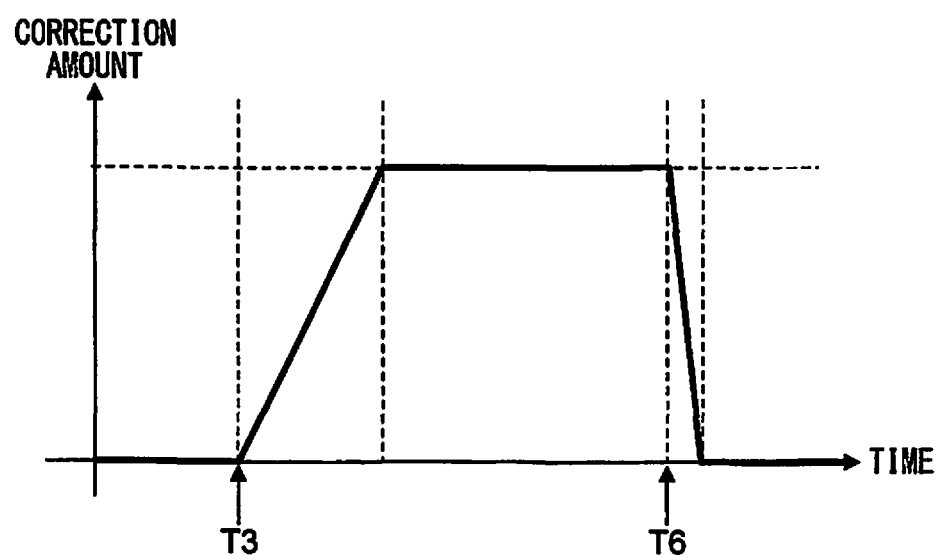
FIG. 4 is a diagram depicting a relationship between correction amount and time.

FIG. 4 is a diagram depicting a relationship between correction amount and time, and indicates a correction profile. As can be seen by comparing FIG. 3 with FIG. 4, the correction profile substantially corresponds to the relationship between pressurization force and time depicted in FIG. 3. Then, on the basis of correction amount of the correction profile, the robot control device 10 adds a correction amount to an operation command per predetermined control cycle of the robot R.

Figure 5:
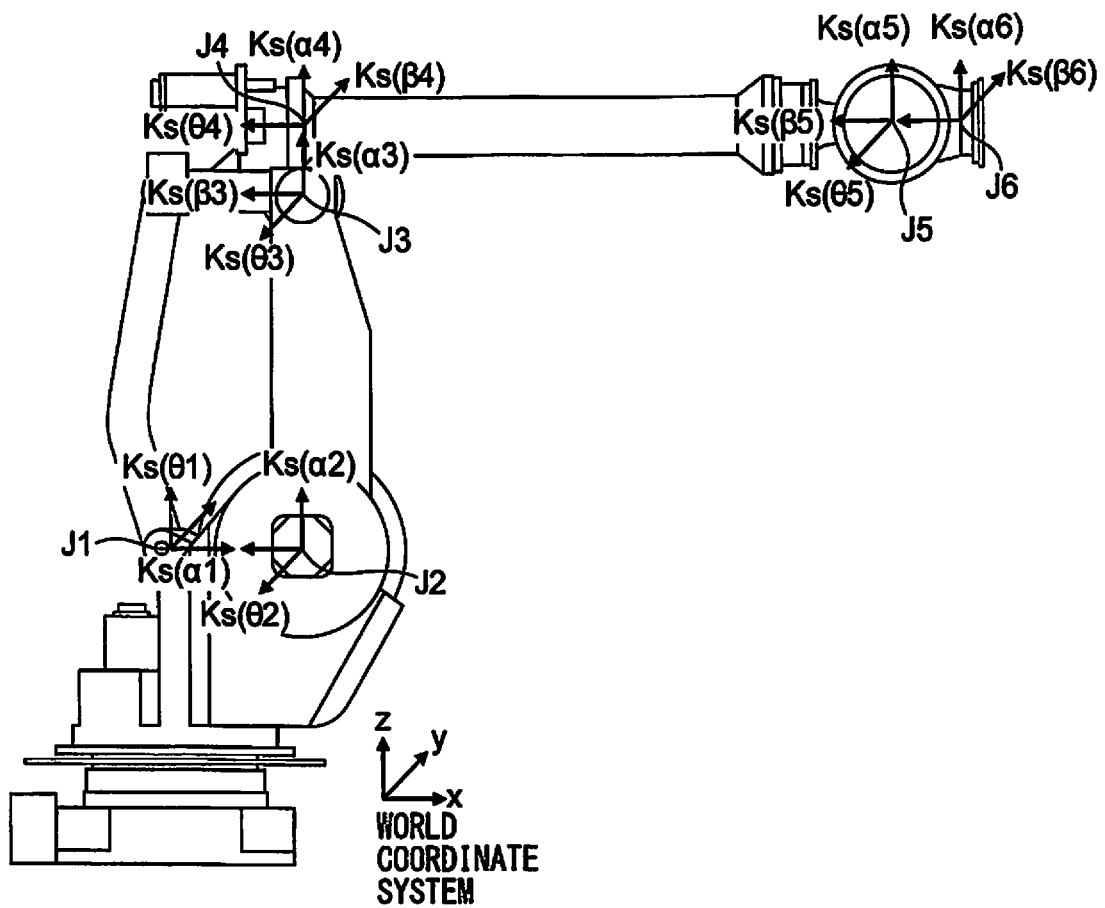
FIG. 5 is a side view of a robot.

Hereinafter, a description will be given a method for calculating a correction amount. FIG. 5 is a side view of the robot. As depicted in FIG. 5, a spring constant in a world coordinate system is predetermined for the robot R as a spring model. In FIG. 5, Ks($\theta$1 to $\theta$6) each represent a spring constant around an axis Z in respective shafts J1 to J6 of the robot R; Ks($\alpha$1 to $\alpha$6) each represent a spring constant around an axis X in the respective shafts J1 to J6; and Ks($\beta$1 to $\beta$6) each represent a spring constant around an axis Y in the respective shafts J1 to J6. For simplification, some of the spring constants are omitted in FIG. 5.

The correction amount calculation unit 11 calculates a correction amount ($\Delta$x, $\Delta$y, $\Delta$z) in the tip position of the tool T from the following formula (1) on the basis of the spring constants depicted in FIG. 5. Such a correction amount is assumed to be calculated per predetermined control cycle.

$$(\Delta x, \Delta y, \Delta z) = f(\omega, \text{FORCE}, Ks) \quad (1)$$

In the formula (1), $\omega$ represents a present position of the robot R; FORCE represents a previously designated external force; and Ks represents spring constants depicted in FIG. 5. The present position of the robot R is assumed to be grasped from an encoder (not depicted in the drawing) provided on the motor for driving each shaft of the robot R. The external force will be described later.

The correction amount calculation unit 11 calculates a torque applied to each of the shafts J1 to J6 before and after pressurization from the previously designated external force and the present position of the robot and multiplies the torque by the above-mentioned spring constants. As a result, a correction amount around each of the shafts J1 to J6 is calculated. Then, the correction amount calculation unit 11 calculates a difference between a position when forward conversion is performed in consideration of the correction amount around the each shaft and a position when forward conversion is performed without the consideration of the correction amount therearound, as a correction amount ($\Delta$x, $\Delta$y, $\Delta$z) in the tip position of the tool T due to an external force on the world coordinate system.

An amount of an actual deviation in the tip position of the tool T is influenced by friction between the surface of the workpiece W and the surface of the tool T contacted therewith, but is substantially proportional to the torque applied to each of the shafts J1 to J6 before and after pressurization. However, elements dependent on friction due to rotation of the tool T and nonlinear characteristics of the robot R are not proportional to pressurization force. As for such elements not proportional to pressurization force, it is sufficient to cope with them by adding a variable adjustable per processing position to the formula (1).

When feedback control by a secondary encoder is used in controlling the robot R, influences of backlash of the speed reducer of the robot R and a nonlinear component of a lost-motion region can be eliminated. However, the feedback control by the secondary encoder cannot correct twisting of parts other than a region around the speed reducer (a region around the axis Z in FIG. 5) and a deformation amount of the arm of the robot R. Thus, the feedback control by the secondary encoder and the above-described spring model may be used in combination, and, in that case, correction accuracy for positional deviation of the tool tip can be improved.

When the correction profile generation unit 12 generates a correction profile on the basis of the correction amount per predetermined control cycle calculated by the correction amount calculation unit 11, the following items (a) to (d) are set:

(a) a delay time from the output of a pressurization starting signal at the time point T2 to the start of pressurization at the time point T3 (a pressurization delay time)

(b) a time constant from the start of pressurization at the time point T3 to reaching a target pressurization force at the time point T4 (a pressurization time constant)

(c) a delay time from the output of a pressure reduction starting signal at the time point T5 to the start of pressure reduction at the time point T6 (a pressure reduction delay time)

(d) a time constant from the start of pressure reduction at the time point T6 to the completion of pressure reduction at the time point T7 (a pressure reduction time constant)

The correction profile generation unit 12 generates, in advance, a correction profile from the correction amount per predetermined control cycle, and, from the time point T2 to the time point T7 in FIG. 5, adds the correction amount to an operation command per predetermined control cycle of the robot R to supply to a servo motor of each of the shafts J1 to J6 of the robot R. In this case, the above-described items (a) to (d) are assumed to be considered.

As described hereinabove, in the present embodiment, a correction amount is input to the operation command of the robot on the basis of the previously generated correction profile. Thereby, the robot can be controlled so that the tip position of the tool T does not deviate. Accordingly, positional deviation of the tool tip can be easily corrected.

Thus, the present embodiment does not cause the deviation of the processing position on the workpiece W, as indicated by the broken line in FIG. 2. As a result, the first and the second metal members W1 and W2 can be mechanically favorably joined together. Additionally, the present embodiment does not need to use any component for fastening the tool T and the workpiece W to each other, so that the mechanical joining process can be performed in the simple structure.

At the time point T4 in FIG. 5, overshoot of the pressurization force can sometimes occur, or in FIG. 5, there can sometimes exist a plurality of different target pressurization forces. In such a case, it is sufficient to increase variables to be set for the correction profile, whereby the positional deviation of the tool tip can be corrected more accurately.

Meanwhile, when performing pressurization operation by driving the robot R, it can sometimes occur that the current value of the motor before pressurization, for example, at the time point T2, is minus and the current value of the motor after the pressurization, for example, at the time point T4, changes to plus. In such a case, due to inversion of the motor, there is an influence of backlash, thereby causing a situation where there is a shortage of correction amount.

Accordingly, preferably, the inversion determination unit 13 determines whether the sign of the current value of the motor changes before and after pressurization operation. Then, when the sign changes, a backlash correction amount calculated by the backlash correction amount calculation unit 14 is additionally added to the correction amount calculated by the correction amount unit 11.

Figure 6:
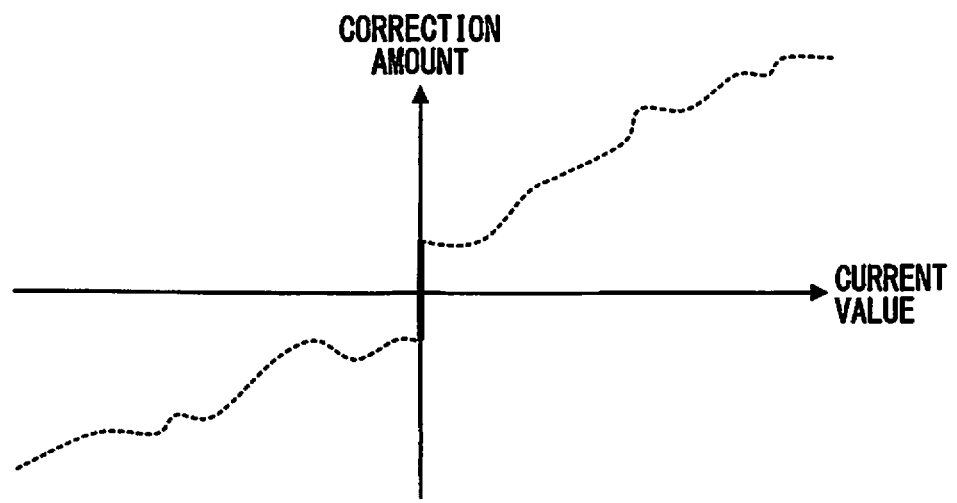
FIG. 6 is a diagram depicting a relationship between correction amount and current value of a motor.

FIG. 6 is a diagram depicting a relationship between correction amount and current value of the motor. In FIG. 6, when the current value changes from minus to plus, a backlash correction amount is added to the correction amount. As a result, the correction amount significantly increases when the current value changes from minus to plus. Thereby, it can be seen that the shortage of correction amount for the tip position of the tool T can be compensated and the tip position thereof can be accurately corrected.

The backlash correction amount calculated by the backlash correction amount calculation unit 14 may be simultaneously identified in calibration of the spring constants for the spring model depicted in FIG. 5. Alternatively, the lost-motion region may be approximated by a nonlinear function and, in the calibration of the spring constants of the spring model depicted in FIG. 5, a constant of the function may be simultaneously identified to obtain a lost-motion amount. In addition, a known value can be used as the backlash correction amount.

Figure 7:
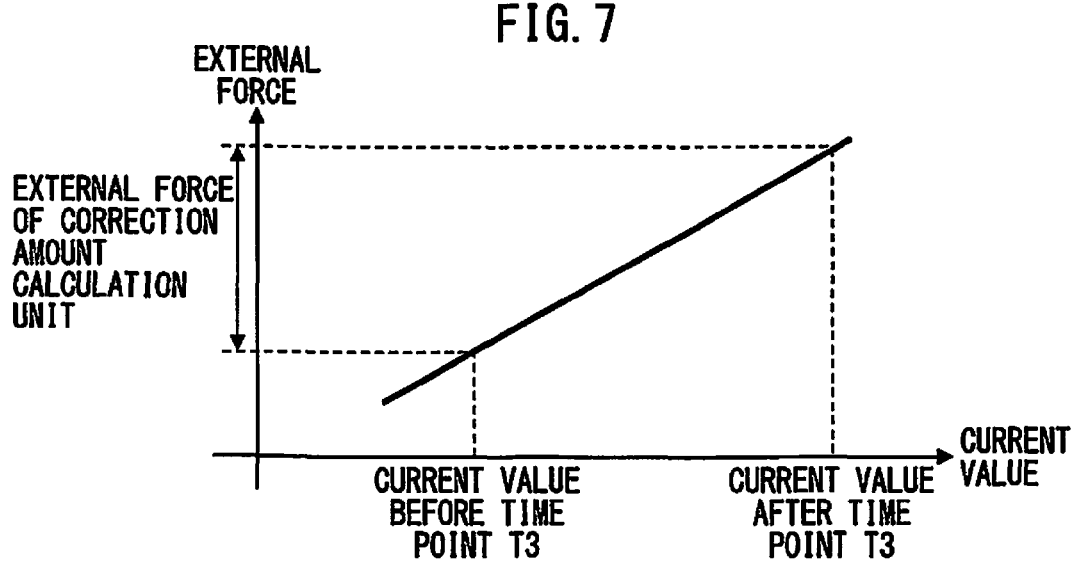
FIG. 7 is a diagram depicting a relationship between external force applied to a tool and current value of the motor.

FIG. 7 is a diagram depicting a relationship between external force applied to the tool and current value of the motor. As depicted in FIG. 7, an external force applied to the tool and the current value of the motor are substantially in a linear relationship. Then, in FIG. 7, there is depicted a range from a current value before the time point T3 to a current value after the time point T3, for example, a current value at the time point T5. Then, a deviation between an external force corresponding to the current value before the time point T3 and an external force corresponding to the current value after the time point T3 corresponds to an external force calculated by the correction amount calculation unit 11.

The relationship between such an external force applied to the tool and current value of the motor is previously stored in the form of a map or table in the storage unit 15. Then, in order to determine some variables of the correction profile, the robot R is driven to perform pressurization operation in a state without correction. In this case, the external force calculation unit 16 acquires a current value of each motor of the shafts J1 to J6.

Then, the external force calculation unit 16 refers to the map or table stored in the storage unit 15 to calculate an external force corresponding to the acquired current value of the each motor. In this case, it is preferable to adopt a current value having a maximum amount of change before and after the pressurization operation. After that, the correction amount calculation unit 11 may calculate a correction amount using the calculated external force, and the correction profile generation unit 12 may generate a correction profile using the calculated correction amount. In such a case, the external force used by the correction amount calculation unit 11 can be automatically set using the relationship between external force and current value of the motor stored in the storage unit 15.

Figure 8:
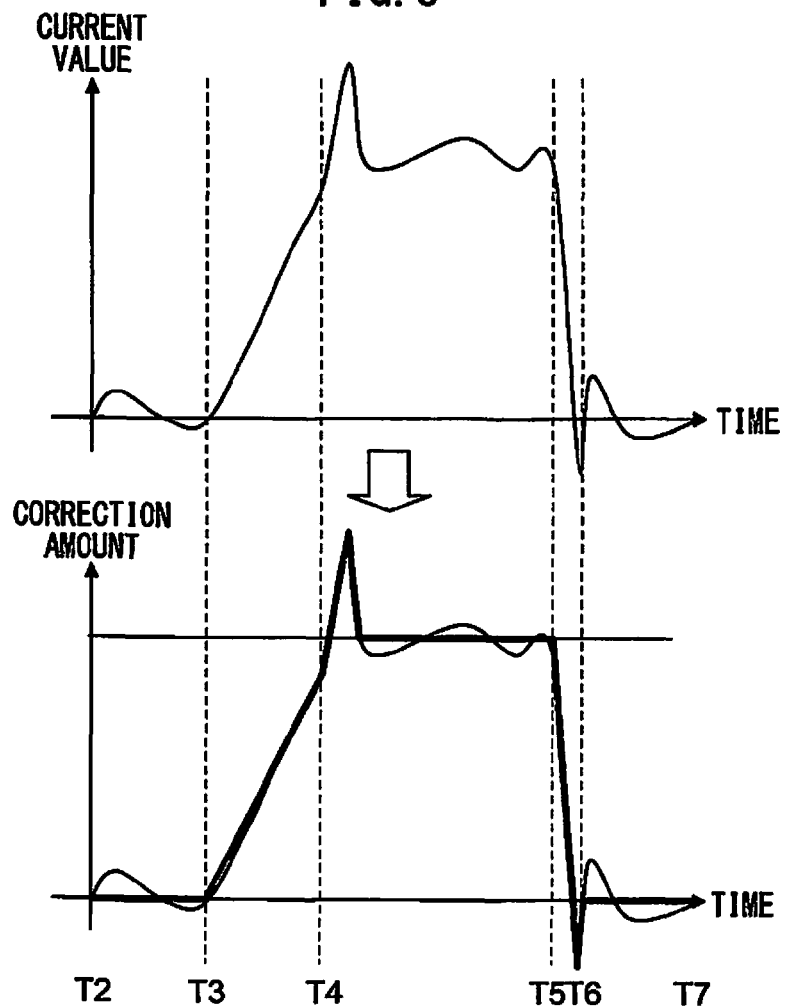
FIG. 8 is a diagram depicting a relationship between current value and time and a relationship between correction amount and time.

In performing the pressurization operation by driving the robot R, the current value of the motor from starting to press the tool T against the workpiece W to completely separate the tool T from the workpiece W may be stored in time series in the time-series storage unit 17. FIG. 8 is a diagram indicating a relationship between current value thus stored and time and a relationship between correction amount and time. FIG. 8 is assumed to indicate a time range corresponding to the range from the time point T2 to the time point T7 in FIG. 3. From the current value of the motor thus stored in time series, variables necessary to generate a correction profile can be automatically set. Then, a correction profile can be generated in the same method as described above.

When the stored current value of the motor includes a delay due to feedback, a pressurization delay time, a pressure reduction delay time, and the like are set in consideration of the delay. Instead of the current value of the motor, a deviation amount of the motor may be stored.

As depicted in FIG. 8, the current value has overshot after the time point T4, and also has undershot before the time point T6. Accordingly, the external force calculation unit 16 can calculate an external force more accurately. Then, as can be seen from FIG. 8, a correction amount generated on the basis of such an external force includes amounts corresponding to the overshooting and the undershooting. It will thus be apparent that a still more accurate correction amount can be calculated. This is particularly advantageous when the robot R repeatedly performs the same work.

Advantageous Effects of Invention

In the first aspect of the present invention, a correction amount is input to an operation command of the robot on the basis of a previously generated correction profile. Thus, positional deviation of the tool tip can be easily corrected without using any specific component.

In the second aspect of the invention, a correction amount at a time when starting to press the tool against the workpiece can be accurately obtained.

In the third aspect of the invention, a correction amount at a time when starting to separate the tool from the workpiece can be accurately obtained.

In the fourth aspect of the invention, a shortage of correction amount can be compensated for by adding a backlash correction amount, thereby allowing the tip position of the tool to be corrected more accurately. The motor provided on the robot or the tool may be any one of the motor of each shaft of the robot, the motor for rotating the tool, or the motor for bringing the tool close to the workpiece or separate it therefrom.

In the fifth aspect of the invention, an external force used by the correction amount calculation unit can be automatically set using the relationship between external force and current value stored in the storage unit. The storage unit preferably stores a map or table of the relationship between external force and current value of the motor.

In the sixth aspect of the invention, the use of the current value of the motor actually recorded by operating the robot allows more accurate calculation of an external force. Thus, a still more accurate correction amount can be calculated. This is particularly advantageous when the robot repeatedly performs the same work.

While the present invention has been described using some typical embodiments, it should be understood by those skilled in the art that the foregoing and other various changes, omissions, and additions may be made therein and thereto without departing from the spirit and scope of the invention.

What is claimed is:

1. A robot control device for controlling a robot to perform work by pressing a tool attached to a tip of the robot against a workpiece, the robot control device comprising a processor configured to:
    calculate a correction amount for correcting a deviation of a tip position of the tool due to an external force applied to the tool, and
    generate a correction profile indicating a relationship between the calculated correction amount calculated by the correction amount calculation unit and time,
    wherein the correction amount is calculated so that the external force applied to the tool becomes smaller than a maximum static friction force between the workpiece and the tool,
    wherein the correction amount is added to an operation command of the robot on the basis of the correction profile generated in advance, and
    wherein an operation of the robot is controlled based on the operation command.

2. The robot control device according to claim 1, wherein as the tool starts to be pressed against the workpiece and the external force applied to the tool increases, the processor is configured to generate the correction profile so as to increase the correction amount.

3. The robot control device according to claim 1, wherein as the tool starts to be separated from the workpiece and the external force applied to the tool decreases, the processor is configured to generate the correction profile so as to decrease the correction amount.

4. The robot control device according to claim 1, wherein the processor is further configured to
    determine, on the basis of a current value of a motor provided on the robot or the tool, whether the motor has been inverted, and
    when the processor determines that the motor has been inverted,
        calculate a backlash correction amount for correcting a deviation of the tip position of the tool due to backlash, and
        add the calculated backlash correction amount to the calculated correction amount.

5. The robot control device according to claim 1, further comprising:
    a storage that stores a relationship between (i) a current value of a motor provided on the robot or the tool and (ii) the external force applied to the tool,
    wherein the processor is further configured to calculate the external force on the basis of the relationship stored in the storage and the current value of the motor.

6. A robot control device for controlling a robot to perform work by pressing a tool attached to a tip of the robot against a workpiece, the robot control device comprising:
    a storage that stores a relationship between (i) a current value of a motor provided on the robot or the tool and (ii) an external force applied to the tool;
    a processor configured to
        calculate the external force on the basis of the relationship stored in the storage and the current value of the motor,
        calculate a correction amount for correcting a deviation of a tip position of the tool due to the external force applied to the tool, and
        generate a correction profile indicating a relationship between the correction amount and time; and
    a time-series storage that stores the current value of the motor in time series from (a) starting to press the tool against the workpiece to (b) completely separating the tool from the workpiece, wherein the processor is further configured to calculate the external force on the basis of the relationship stored in the storage and the current value of the motor stored in the time-series storage,
    wherein the correction amount is added to an operation command of the robot on the basis of the correction profile generated in advance, and
    wherein an operation of the robot is controlled based on the operation command.

* * * * *